(12) United States Patent
Recio, III et al.

(10) Patent No.: US 11,643,591 B2
(45) Date of Patent: *May 9, 2023

(54) POLYAMINE POLYETHERS AS NONEMULSIFIER COMPONENTS

(71) Applicant: Halliburton Energy Services, Inc., Houston, TX (US)

(72) Inventors: Antonio Recio, III, Humble, TX (US); Kristina Henkel Holan, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 82 days.

This patent is subject to a terminal disclaimer.

(21) Appl. No.: 16/970,875

(22) PCT Filed: Apr. 27, 2018

(86) PCT No.: PCT/US2018/029785
§ 371 (c)(1),
(2) Date: Aug. 18, 2020

(87) PCT Pub. No.: WO2019/209312
PCT Pub. Date: Oct. 31, 2019

(65) Prior Publication Data
US 2020/0377788 A1    Dec. 3, 2020

(51) Int. Cl.
*C09K 8/68* (2006.01)
*C09K 8/60* (2006.01)
(Continued)

(52) U.S. Cl.
CPC ............... *C09K 8/68* (2013.01); *C09K 8/602* (2013.01); *C09K 8/80* (2013.01); *E21B 43/267* (2013.01); *E21B 43/38* (2013.01); *C09K 2208/26* (2013.01)

(58) Field of Classification Search
CPC .......... C09K 8/584; C09K 8/68; C09K 8/035; C09K 8/602; C09K 8/80; C09K 8/94; C09K 8/703; C09K 8/588; E21B 43/16; E21B 21/068; E21B 43/006; E21B 43/267; E21B 43/26; E21B 43/38
See application file for complete search history.

(56) References Cited

U.S. PATENT DOCUMENTS 5,045,212 A    9/1991 Augustin et al.
6,939,832 B2    9/2005 Collins
(Continued)

FOREIGN PATENT DOCUMENTS

CN    105273703    1/2016
CN    105885029 A  *  8/2016
(Continued)

OTHER PUBLICATIONS

Translation of CN 103619984 (Year: 2014).*
(Continued)

*Primary Examiner* — Zakiya W Bates
(74) *Attorney, Agent, or Firm* — McAfee & Taft

(57) ABSTRACT

A method of treating a well, comprising introducing a well treatment fluid into the well. The well treatment fluid includes an aqueous base fluid and a dewatering agent. The dewatering agent includes water, a demulsifying surfactant, and a polyamine polyether.

26 Claims, 5 Drawing Sheets

(51) Int. Cl.
*C09K 8/80* (2006.01)
*E21B 43/267* (2006.01)
*E21B 43/38* (2006.01)
*E21B 43/22* (2006.01)

(56) References Cited

U.S. PATENT DOCUMENTS

| | | |
|---|---|---|
| 8,985,212 B1 | 3/2015 | Crespo et al. |
| 2002/0169085 A1 | 11/2002 | Miller et al. |
| 2003/0069143 A1* | 4/2003 | Collins .................. C09K 8/54 507/200 |
| 2006/0030493 A1 | 2/2006 | Segura |
| 2010/0056398 A1 | 3/2010 | Steinbrenner et al. |
| 2010/0307752 A1 | 12/2010 | Rey et al. |
| 2011/0071056 A1* | 3/2011 | Saini .................. C09K 8/035 507/131 |
| 2014/0235885 A1 | 8/2014 | Koczo et al. |
| 2016/0032197 A1 | 2/2016 | Weisner |
| 2019/0194526 A1* | 6/2019 | Holtsclaw .............. C09K 8/602 |

FOREIGN PATENT DOCUMENTS

| | | |
|---|---|---|
| WO | 201614310 | 1/2016 |
| WO | 2017099706 A1 | 6/2017 |
| WO | 2017151159 A1 | 9/2017 |

OTHER PUBLICATIONS

Canadian Office Action mailed in corresponding Canadian Application No. 3,090,866 dated Oct. 5, 2021, pp. 1-6.
International Search Report and Written Opinion issued in PCT Application No. PCT/US2018/029785 dated Jan. 28, 2019.

* cited by examiner

Polyamine Polyether (PAPE) Enhanced Column Flow Performance with 2 different Crude Oils (Black API = 36; Striped API = 45)

POLYAMINE POLYETHERS AS NONEMULSIFIER COMPONENTS

BACKGROUND

Well treatment fluids are pumped into a well and/or circulated through the wellbore of an oil and gas well in connection with a variety of treatment operations including, for example, drilling, cementing, completion, and stimulation operations. The types of components of a particular well treatment fluid and the resulting properties thereof vary depending on the application, well conditions and other factors known to those skilled in the art.

For example, in drilling a well, an aqueous-based drilling fluid (commonly referred to as a drilling mud) is circulated from the surface through the drill string and drill bit and back to the surface through the annulus between the drill string and the borehole wall. The drilling fluid functions, for example, to cool, lubricate and support the drill bit, remove cuttings from the wellbore, control formation pressures, and maintain the stability of the wellbore.

As another example, prior to a primary or other cementing operation, an aqueous-based spacer fluid is circulated through the wellbore to separate the drilling fluid from the cement slurry and prepare the drill string or casing and the formation for the cementing operation. For example, a spacer fluid is often used to clean out drilling mud and other materials in the wellbore prior to injection of the lead cement slurry. For example, in a primary cementing operation, the spacer fluid displaces the drilling fluid from the annulus and conditions the casing and annular surface to form a good bond with the cement. Spacer fluids can be used to separate fluids in other applications as well.

As yet another example, in final operations and testing to prepare a well for production, various solids free or low solids fluids, often referred to as completion fluids, are typically circulated through the wellbore. For example, once the drilling process is complete, it is often necessary to install gravel packs, production liners, packers, valves and other components in the wellbore. Completion fluids are used during such operations to control the well without damaging producing zones and inhibiting ultimate production from the well. Completion fluids can be used to prepare, repair, clean out and complete the wellbore.

Another example is a stimulation fluid. Examples of stimulation fluids include acidizing fluids and hydraulic fracturing fluids.

In an acidizing operation, an acidizing fluid is injected into the well at a pressure below the fracture gradient of the formation to either stimulate the well or remove damage. For example, the acidizing fluid can dissolve sediments and mud solids within the pores of the formation matrix that inhibit the permeability of the rock. This process enlarges the natural pores of the reservoir which stimulates the flow of hydrocarbons.

In a hydraulic fracturing operation, a fracturing fluid is pumped into a subterranean formation, for example, an oil reservoir, at a pressure sufficient to initiate and/or extend one or more fractures in the formation. The result is an expansion in the productive surface-area of the reservoir. Proppant particulates are carried by the fracturing fluid and placed in the fracture(s) to hold the fracture(s) open once the hydraulic pressure on the formation is released. The resulting propped fracture provides one or more conductive channels through which fluids in the formation can flow from the formation to the wellbore.

Various chemical additives are typically added to a well treatment fluid to modify certain properties of the fluid and/or control the impact of the fluid based on the type of treatment being carried out, well conditions and other factors known to those skilled in the art. For example, various surfactants are added to well treatment fluids for a variety of purposes.

One type of surfactant that is commonly added to well treatment fluids is a demulsifier. Demulsifiers, also known as emulsion breakers, are a class of specialty surfactants used to separate oil-in-water emulsions and water-in-oil emulsions into separate oil and water phases. For example, demulsification can be important during hydraulic fracturing operations because the presence of emulsions can decrease the permeability of the fractured formation and ultimately reduce production. Important factors in any demulsification technique include the rate at which the phase separation takes place and the amount of water left in the separated oil phase.

The value of any surfactant formulation or other well treatment additive must be balanced against the cost of the chemicals. Unfortunately, the cost of many demulsifiers is too high to justify their use in some applications.

BRIEF DESCRIPTION OF THE DRAWINGS

The drawings included with this application illustrate certain aspects of the embodiments described herein. However, the drawings should not be viewed as illustrating exclusive embodiments. The subject matter disclosed herein is capable of considerable modifications, alterations, combinations, and equivalents in form and function, as will be evident to those skilled in the art with the benefit of this disclosure.

DETAILED DESCRIPTION

Figure 1:
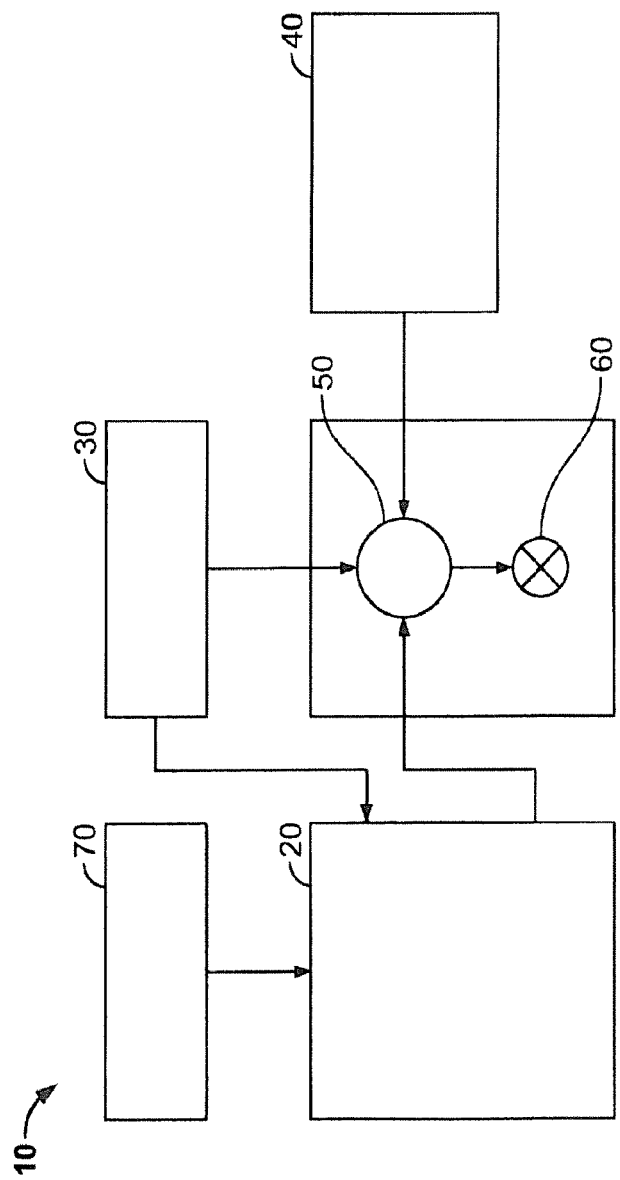
FIG. 1 is a diagram illustrating an example of a fracturing system that can be used in accordance with certain embodiments of the present disclosure.

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure.

In accordance with the present disclosure, a method of treating a well and a well treatment fluid are provided. Unless stated otherwise, as used herein and in the appended claims, a "well" means a wellbore extending into the ground and a subterranean formation penetrated by the wellbore. For example, the well can be an oil well, a natural gas well, a water well or any combination thereof. A method of treating a well means treating the well, wellbore, and/or the subterranean formation. A "well treatment fluid" means any fluid that is introduced into a well to treat the well, the wellbore, and/or the subterranean formation.

For example, the method of treating a well can be a method of drilling a well in which a well treatment fluid is circulated through the wellbore, and the well treatment fluid can be a drilling fluid. For example, the method of treating a well can be a method of treating the well with a spacer fluid (for example, a cement spacer fluid), and the well treatment fluid can be a spacer fluid. For example, the method of treating a well can be a method of completing the well, and the well treatment fluid can be a completion fluid. For example, the method of treating a well can be a method of stimulating a well, and the well treatment fluid can be a stimulation fluid. For example, the method of stimulating a well can be a method of acidizing the well, and the well treatment fluid can be an acidizing fluid (for example, a matrix acidizing fluid). For example, the method of stimulating a well can be a method of fracturing a subterranean formation, and the well treatment fluid can be a hydraulic fracturing fluid.

The method of treating a well disclosed herein comprises introducing a well treatment fluid into the well. The well treatment fluid includes an aqueous base fluid and a dewatering agent.

The aqueous base fluid of the well treatment fluid used in the method disclosed herein can be water. The water can come from a variety of sources. For example, the water can be fresh water. For example, the water can be salt-containing water. Examples of salt-containing water include saltwater, brine (for example, saturated saltwater or produced water), seawater, brackish water, produced water (for example, water produced from a subterranean formation), formation water, treated flowback water, and any combination thereof.

The dewatering agent of the well treatment fluid used in the method disclosed herein includes water, a demulsifying surfactant, and a polyamine polyether. As used herein and in the appended claims, a "dewatering agent" means a surfactant composition that removes water from an oil and water emulsion. An example of a dewatering agent is a demulsifier.

For example, the dewatering agent can be a water external emulsion. For example, the dewatering agent can be present in the well treatment fluid in an amount in the range of from about 0.001% by volume to about 80.0% by volume based on the total volume of the treatment fluid. For example, the dewatering agent can be present in the well treatment fluid in an amount in the range of from about 0.01% by volume to about 25.0% by volume based on the total volume of the treatment fluid. For example, the dewatering agent can be present in the well treatment fluid in an amount in the range of from about 1.0% by volume to about 10.0% by volume based on the total volume of the treatment fluid. For example, the dewatering agent can be present in the well treatment fluid in an amount of about 5.0% by volume, based on the total volume of the treatment fluid.

The water of the dewatering agent can come from a variety of sources. For example, the water can be fresh water. For example, the water can be salt-containing water. Examples of salt-containing water include saltwater, brine (for example, saturated saltwater or produced water), seawater, brackish water, produced water (for example, water produced from a subterranean formation), formation water, treated flowback water, and any combination thereof.

As used herein and in the appended claims, a demulsifying surfactant means one or more surfactants that at least partially separate water and oil emulsions into discrete oil and water phases. An example of a water and oil emulsion is a water-in-oil crude oil emulsion.

For example, the demulsifying surfactant can be present in the dewatering agent in an amount in the range of from about 0.001% by volume to about 80.0% by volume, based on the total volume of the dewatering agent. For example, the demulsifying surfactant can be present in the dewatering agent in an amount in the range of from about 0.01% by volume to about 25% by volume, based on the total volume of the dewatering agent. For example, the demulsifying surfactant can be present in the dewatering agent in an amount in the range of from about 1.0% by volume to about 10.0% by volume, based on the total volume of the dewatering agent. For example, the demulsifying surfactant can be present in the dewatering agent in an amount of about 5% by volume, based on the total volume of the dewatering agent.

For example, the demulsifying surfactant can include a solvent, a co-solvent, an ethoxylated alcohol, and a resin alkoxylated oligomer.

As used herein and in the appended claims, a "solvent" means a substance that can dissolve a solute (a chemically distinct liquid, solid or gas) to form a solution. For example, the solvent of the demulsifying surfactant can be selected from the group of methyl 9-decenoate, methyl 9-dodecenoate, N, N-dimethyl 9-decenamide, diethyl carbonate, triethyl citrate, dodecyl acetate, dimethyl 2-methylglutarate, 1-dodecyl-2-pyrrolidinone, 2-dodecyl-pyrrolidinone, N—$(C_2H_4)$ $CH_3$-pyrrolidinone (wherein n is 1 to 22), n-octyl-pyrrolidinone, dibutyl ether, isoamyl ether, di-n-amyl ether, dihexyl ether, heptyl ether, dioctyl ether, dodecyl ether, benzyl hexyl ether, di-n-alkyl-ethers having the formula $[(CH_2)CH_3]_2$ (wherein x is 3 to 35), and combinations thereof. For example, the solvent of the demulsifying surfactant can be selected from the group of dimethyl 2-methylglutarate, 1-dodecyl-2-pyrrolidinone, N—$(C_2H_4)_n$$CH3$-pyrrolidinone (wherein n is 6 to 12), dimethyl succinate, dimethyl glutarate, dimethyl adipate, and combinations thereof. For example, the solvent of the demulsifying surfactant can be dimethyl 2-methyglutarate.

For example, the solvent can be present in the dewatering agent in an amount in the range of from about 0.5% to about 50.0% by volume, based on the total volume of the dewatering agent. For example, the solvent can be present in the dewatering agent in an amount in the range of from about 1.0% to about 25.0% by volume, based on the total volume of the dewatering agent. For example, the solvent can be present in the dewatering agent in an amount in the range of from about 2.5% to about 10.0% by volume, based on the total volume of the dewatering agent. For example, the solvent can be present in the dewatering agent in an amount of about 5% by volume, based on the total volume of the dewatering agent.

As used herein and in the appended claims, a "co-solvent" means a substance that can dissolve a solute (a chemically distinct liquid, solid or gas) to form a solution and enhance the solvency of the solvent. For example, the co-solvent of the demulsifying surfactant can be selected from the group of ethanol, butanol, n-propanol, 1-hexanol, 2-hexanol, isopropanol, and combinations thereof. For example, the co-solvent of the demulsifying surfactant can be selected from the group of ethanol, butanol, isopropanol, and combinations thereof. For example, the co-solvent of the demulsifying surfactant can be isopropanol.

For example, the co-solvent can be present in the dewatering agent in an amount in the range of from about 0.5% by volume to about 85.0% by volume, based on the total weight of the dewatering agent. For example, the co-solvent can be present in the dewatering agent in an amount in the range of from about 1.0% by volume to about 60.0% by volume, based on the total weight of the dewatering agent. For example, the co-solvent can be present in the dewatering agent in an amount in the range of from about 15.0% by volume to about 45.0% by volume, based on the total weight of the dewatering agent. For example, the co-solvent can be present in the dewatering agent in an amount of about 30.0% by volume, based on the total weight of the dewatering agent.

The ethoxylated alcohol of the demulsifying surfactant functions as a surface tension modifier. For example, the ethoxylated alcohol of the demulsifying surfactant can be selected from the group of ethoxylated alcohols, ethoxylated amines, ethoxylated esters, ethoxylated amides, secondary alcohol ethoxylates having from 6 to 25 carbon atoms and 1 to 18 ethylene oxide groups, and combinations thereof. For example, the ethoxylated alcohol can be selected from linear, primary tridecyl alcohol ethoxylates having from 12 to 18 carbon atoms and 18 ethylene oxide units, secondary alcohol ethoxylates having 15 carbon atoms and 15 ethylene oxide units, and combinations thereof. For example, the ethoxylated alcohol can be one or more linear, primary alcohol ethoxylates having from 12 to 14 carbon atoms and 7 ethylene oxide units.

For example, the ethoxylated alcohol can be present in the dewatering agent in an amount in the range of from about 0.5% by volume to about 60.0% by volume, based on the total volume of the dewatering agent. For example, the ethoxylated alcohol can be present in the dewatering agent in an amount in the range of from about 1.0% by volume to about 40.0% by volume, based on the total volume of the dewatering agent. For example, the ethoxylated alcohol can be present in the dewatering agent in an amount in the range of from about 2.5% by volume to about 20.0% by volume, based on the total volume of the dewatering agent. For example, the ethoxylated alcohol can be present in the dewatering agent in an amount of about 5.0% by volume, based on the total volume of the dewatering agent.

The resin alkoxylated oligomer of the demulsifying surfactant functions in the demulsifying surfactant as a demulsifier. For example, the resin alkoxylated oligomer of the demulsifying agent can be selected from the group of phenol formaldehyde ethoxylates, alkoxylated alkyl phenol formaldehyde resins, epoxy resin alkoxylates, poly diepoxide ethoxylates, phenolic resins, methyloxirane polymers, phenol formaldehyde polymers with methyloxirane, phenol formaldehyde oxiranes, and combinations thereof. For example, the resin alkoxylated oligomer of the demulsifying agent can be selected from the group of epoxy resin alkoxylates, methyloxirane polymers, phenol formaldehyde polymers with methyloxirane, phenol formaldehyde oxiranes, and combinations thereof. For example, the resin alkoxylated oligomer of the demulsifying agent can be one or more phenol formaldehyde oxiranes.

For example, the resin alkoxylated oligomer can be present in the dewatering agent in an amount in the range from about 0.5% by volume to about 80.0% by volume, based on the total volume of the dewatering agent. For example, the resin alkoxylated oligomer can be present in the dewatering agent in an amount in the range from about 1.0% by volume to about 60.0% by volume, based on the total volume of the dewatering agent. For example, the resin alkoxylated oligomer can be present in the dewatering agent in an amount in the range from about 2.5% by volume to about 10.0% by volume, based on the total volume of the dewatering agent. For example, the resin alkoxylated oligomer can be present in the dewatering agent in an amount of about 5.0% by volume, based on the total volume of the dewatering agent.

For example, the polyamine polyether of the dewatering agent can be selected from the group of polyols, amine oxyalkylates, alkoxylated polyamines, amine-initiated polyol block copolymers, ethylenediamine ethoxylated and/or propoxylated, polyethyleneimine polymers, and combinations thereof.

For example, the polyamine polyether in the dewatering agent can be a polyol. Examples of polyols suitable for use as the polyamine polyether of the dewatering agent are sold by Solvay in association with the names and trade designations Clearbreak® 195, Clearbreak® 217, and Clearbreak® 6218. Additional examples of polyols suitable for use as the polyamine polyether of the dewatering agent are sold by Croda in association with the names and trade designations Kemelix® D317, Kemelix® D501, Kemelix® D503, Kemelix® D506, Kemelix® D511, Synperonic® PE/L121, and Synperonic® PE/L64. Additional examples of polyols suitable for use as the polyamine polyether of the dewatering agent are sold by Huntsman in association with the names and trade designations Surfonic® OFD 101, Surfonic® OFD 328, Surfonic® OFD 335, Surfonic® POA-17R2, Jeffox® WL 660, and Jeffox® WL 5000. Additional examples of polyols suitable for use as the polyamine polyether of the dewatering agent are sold by Dow in association with the names and trade designations Demtrol® 1010, Demtrol® 1020, Demtrol® 1030, Demtrol® 1040, Demtrol® 1113, Demtrol® 1114, Demtrol® 1115, and Demtrol® 1130.

For example, the polyamine polyether in the dewatering agent can be an amine oxyalkylate. An example of an amine oxyalkylate that is suitable for use as the polyamine polyether of the dewatering agent is sold by Solvay in association with the name and trade designation Clearbreak® 291. Additional examples of amine oxyalkylates suitable for use as the polyamine polyether of the dewatering agent are sold by AkzoNobel in association with the names and trade designations Witbreak™ DPG-482, Witbreak™ DRI-9026, Witbreak™ GT-705, Witbreak™ GT-750, and Witbreak™ GT-756.

For example, the polyamine polyether in the dewatering agent can be an alkoxylated polyamine. Examples of alkoxylated polyamines that are suitable for use as the polyamine polyether of the dewatering agent are sold by Huntsman in association with the names and trade designations Surfonic® OFD 150, Suronic® OFD 300, Surfonic® OFD 301, Surfonic® OFD 302, and Surfonic® OFD 360. Additional examples of alkoxylated polyamines that are suitable for use as the polyamine polyether of the dewatering agent are sold by BASF in association with the names and trade designations Basorol®DB-9904, Basorolo® P DB-5951, and Basorol® 904. An example of a mixture of alkoxylated polyamines suitable for use as the polyamine polyether of the dewatering agent is sold by KMCO LLC of Crosby, Tex. in association with the trade designation KB 1410.

For example, the polyamine polyether in the dewatering agent can be an amine-initiated polyol block copolymer. Examples of amine-initiated polyol block copolymers that are suitable for use as the polyamine polyether of the dewatering agent are sold by Dow in association with the names and trade designations Demtrol® 4026, Demtrol® 4017, Demtrol®, 4110, Demtrol® 4115, and Demtrol® 4120.

For example, the polyamine polyether in the dewatering agent can be an ethylenediamine ethoxylated and/or propoxylated, polyethyleneimine polymer. Examples of ethylenediamine ethoxylated and/or propoxylated, polyethyleneimine polymers that are suitable for use as the polyamine polyether of the dewatering agent are sold by Croda in association with the names and trade designations Kemelix® 3216x, Kemelix® 3422X, Kemelix® 3551X, Kemelix® 3515X, Kemelix® D510, and Kemelix® D513. Additional examples of ethylenediamine ethoxylated and/or propoxylated, polyethyleneimine polymers that are suitable for use as the polyamine polyether of the dewatering agent are sold by BASF in association with the names and trade designations Basorol® P DB-9390, Basorol® P DB-9392, Basorol® P DB-9360, and Basorol® P DB-9393. An additional example of an ethylenediamine ethoxylated and/or propoxylated, polyethyleneimine polymer that is suitable for use as the polyamine polyether of the dewatering agent is sold by Sasol in association with the name and trade designation Diammin™ EDA-72.

For example, the polyamine polyether can be present in the dewatering agent in an amount in the range of from about 0.5% by volume to about 80.0% by volume, based on the total volume of the dewatering agent. For example, the polyamine polyether can be present in the dewatering agent in an amount in the range of from about 1.0% by volume to about 60.0% by volume, based on the total volume of the dewatering agent. For example, the polyamine polyether can be present in the dewatering agent in an amount in the range of from about 2.5% by volume to about 10.0% by volume, based on the total volume of the dewatering agent. For example, the polyamine polyether can be present in the dewatering agent in an amount of about 5.0% by volume, based on the total volume of the dewatering agent.

The specific amounts of the dewatering agent in general as well as the demulsifying surfactant, components of the demulsifying surfactant, and the polyamine polyether used in the well treatment fluid will depend on the application, the amounts of other components in the well treatment fluid, and other factors known to those skilled in the art with the benefit of this disclosure.

In accordance with the present disclosure, the dewatering agent of the well treatment fluid used in the method disclosed herein functions as an effective demulsifier for water and oil emulsions, for example, water-in-crude oil emulsions. As shown by the examples below, the polyamine polyether of the dewatering agent of the well treatment fluid enhances the demulsifying power of the demulsifying surfactant and results in a more rapid, comprehensive separation of water and oil emulsions. The dewatering agent of the well treatment fluid renders the oil phase devoid of any water which is evident in the final volume of oil after emulsion separation. It provides an aqueous phase devoid of any oil drops or filmy residue. Furthermore, the cost of the dewatering agent is significantly lower than the cost of demulsifying surfactants currently on the market.

The dewatering of the well treatment fluid used in the method disclosed herein also functions as an effective flowback aid. For example, the polyamine polyether of the dewatering agent can enhance the ability of the demulsifying surfactant to reduce capillary pressure and water blockage in a reservoir being treated in accordance with the method disclosed herein, thereby making it easier to recover injected fluids after the treatment has been carried out. For example, the polyamine polyether dewatering agent supplements the ability of the demulsifying agent to enhance the flow back of a fracturing fluid used to fracture a tight shale formation.

In accordance with the method disclosed herein, the well treatment fluid can be introduced into the well, for example, by pumping the well treatment fluid into the well using one or more pumps present on the well site as known to those skilled in the art with the benefit of this disclosure. The components of the well treatment fluid can be mixed together in any manner known to those skilled in the art with the benefit of this disclosure. For example, components can be mixed together using mixing equipment present on the well site. For example, components can be added to the well treatment fluid on the fly as the well treatment fluid is pumped into the wellbore.

The method disclosed herein can further include the step of removing the well treatment fluid from the well.

Additional components that can be included in the well treatment fluid used in the method disclosed herein include friction reducing agents, clay control agents, buffers and other pH adjusting agents, biocides, bactericides, scale inhibitors, weighting materials, fluid loss control additives, bridging materials, lubricants, corrosion inhibitors, non-emulsifiers, proppant particulates (including conventional or primary proppant particulates and micro-proppant particulates), polymer gelling agents, gel stabilizers, gel cross-linkers, gel breakers, and gravel for forming gravel packs. As will be understood by those skilled in the art with the benefit of this disclosure, the additional components and the amounts thereof that are utilized will vary depending on the particular application in which the well treatment fluid is used.

For example, in one embodiment, the method of treating a well disclosed herein is a method of drilling a well into a subterranean formation, and the well treatment fluid is an aqueous-based drilling fluid for use in drilling wells. In addition to the dewatering agent, the drilling fluid includes one or more additional components such as, for example, a viscosifier, a weighting material, a fluid loss control additive, a bridging material, a lubricant, a corrosion inhibitor and/or a suspending agent.

For example, in another embodiment, the method disclosed herein is a method of cementing in a well, and the well treatment fluid is an aqueous-based cement spacer fluid. In addition to the dewatering agent, the cement spacer fluid includes one or more additional components such as, for example, a primary viscosifier, a fluid loss control additive, a bridging material, a suspending agent and a weighting agent.

For example, in another embodiment, the method disclosed herein is a method of completing a well, and the well treatment fluid is an aqueous-based completion fluid. In addition to the dewatering agent, the completion fluid includes one or more additional components such as, for example, a primary viscosifier, a fluid loss control additive, a bridging material, and a suspending agent.

For example, in another embodiment, the method disclosed herein is a method of acidizing a well, and the well treatment fluid is an aqueous-based acidizing fluid. In addition to the dewatering agent, the acidizing fluid includes one or more additional components such as, for example, one or more acids and a corrosion inhibitor.

For example, when the method disclosed herein is a method of acidizing a well, and the well treatment fluid is an aqueous-based acidizing fluid, the acidizing fluid is injected into the well at a pressure below the fracture gradient of the formation to either stimulate the well or remove damage. For example, the acidizing fluid can dissolve sediments and mud solids within the pores of the formation matrix that inhibit the permeability of the rock. This process enlarges the natural pores of the reservoir which stimulates the flow of hydrocarbons.

For example, in another embodiment, the method disclosed herein is a method of fracturing a well, and the well treatment fluid is an aqueous-based fracturing fluid. In addition to the dewatering agent, the fracturing fluid includes one or more additional components such as, for example, a plurality of proppant particulates, one or more polymer gelling agents, one or more gel stabilizers, one or more gel crosslinkers, and one or more gel breakers.

As used herein and in the appended claims, the term "fracturing fluid" means a pad fracturing fluid, a proppant slurry or any other type of treatment fluid that is pumped into the subterranean formation at a pressure above the fracture gradient of the formation during a hydraulic formation fracturing operation. The term "pad fracturing fluid" means a fracturing fluid that does not include primary proppant particulates. A pad fracturing fluid is typically used to initiate the fracture or fracture network and is injected into the formation in multiple stages. The term "proppant slurry" means a fracturing fluid that does include primary proppant particulates. A proppant slurry is typically used after a fracture or fracture network is initiated in the formation and is injected into the formation in multiple stages. A "propped fracture" means a fracture (naturally-occurring or otherwise) in a subterranean formation that contains a plurality of proppant particulates.

Examples of proppant particulates that can be used include any type of proppant particulate known to those skilled in the art to be suitable for use in propping open primary fractures in subterranean formations. For example, suitable proppant particulates can be selected from the group of sand, walnut hulls, resin pre-coated proppant particulates, man-made proppant particulates, and mixtures thereof. For example, a suitable proppant particulate for use herein is natural sand.

Examples of polymer gelling agents that can be included in the fracturing fluid include polyacrylamide, guar and guar derivatives, cellulose and cellulose derivatives, xanthan, diutan, hydroxypropyl cellulose phosphate, and hydroxypropyl starch phosphate, and any combination thereof. Examples of gel stabilizers that can be included in the fracturing fluid include sodium thiosulfate, isoascorbate, erythroborate, and any combination thereof. Examples of gel crosslinkers that can be included in the fracturing fluid include boric acid, disodium octaborate tetrahydrate, sodium diborate, pentaborates, ulexite, colemanite, zirconium lactate, zirconium acetate lactate, zirconium lactate triethanolamine, zirconium carbonate, zirconium acetylacetonate, zirconium malate, zirconium citrate, and zirconium diisopropylamine lactate, and any combination thereof. Examples of gel breakers that can be included in the fracturing fluid include oxidizers, acids, acid releasing agents, enzymes, and any combination thereof.

For example, when the method disclosed herein is a method of fracturing a well, and the well treatment fluid is an aqueous-based fracturing fluid, the method includes pumping a fracturing fluid into the formation at a pressure above the fracture gradient of the formation to form a fracture in the formation, placing proppant particulates in the fracture, and ceasing pumping of the fracturing fluid into the formation. As used herein and in the appended claims, the "fracture gradient" of a formation means the minimum pressure required to create a new fracture or expand an existing fracture in some dimension in the formation. "Forming a fracture in the formation" means forming a new fracture or expanding an existing fracture in some dimension in the formation.

For example, a pad fracturing fluid can first be pumped into the formation in accordance with the disclosed method. At some point, the pad fracturing fluid can be transitioned to the proppant slurry without ceasing the pumping process or otherwise reducing the hydraulic pressure placed on the formation by the fracturing treatment. As known to those skilled in the art with the benefit of this disclosure, if needed or desired, a pill can be pumped into the formation following pumping of the pad fracturing fluid and prior to pumping of the proppant slurry in order to allow the transition from the pad fracturing fluid to the proppant slurry to be made.

A gel can be allowed to form in the fracturing fluid by mixing the aqueous base fluid, polymer gelling agent, gel stabilizer (if used), gel crosslinker (if used) and gel breaker (if used) of the well treatment fluid together, as described above.

The proppant particulates can be placed in the fracture in any manner known to those skilled in the art with the benefit of this disclosure. For example, proppant particulates can be placed in the fracture in accordance with the disclosed method by pumping the fracturing fluid into the formation for a sufficient time and at a sufficient pressure to cause the proppant particulates to be placed in the fracture. The hydraulic pressure placed on the formation forces the fracturing fluid and proppant particulates into the fracture. When the pressure is released on the fracturing fluid, the proppant particulates remain in the fracture. While in place, the proppant particulates hold the fracture open, thereby maintaining the ability for fluid to flow through the fracture to the wellbore.

In one embodiment, the method of treating a well disclosed herein comprises introducing a well treatment fluid (which is the well treatment fluid disclosed herein) into the well. The well treatment fluid includes an aqueous base fluid and a dewatering agent. The dewatering agent includes water, a demulsifying surfactant, and a polyamine polyether. The demulsifying agent includes a solvent, a co-solvent, an ethoxylated alcohol, and a resin alkoxylated oligomer.

In another embodiment, the method of treating a well disclosed herein comprises introducing a well treatment fluid (which is the well treatment fluid disclosed herein) into the well. The well treatment fluid includes an aqueous base fluid and a dewatering agent. The dewatering agent includes water, a demulsifying surfactant, and a polyamine polyether. The demulsifying agent includes a solvent, a co-solvent, an ethoxylated alcohol, and a resin alkoxylated oligomer. The solvent is dimethyl 2-methyglutarate. The co-solvent is isopropanol. The ethoxylated alcohol is one or more secondary alcohol ethoxylates having from 12 to 14 carbon atoms and 7 ethylene oxide units. The resin alkoxylated oligomer is one or more phenol formaldehyde oxiranes.

The well treatment fluid disclosed herein is the well treatment fluid (including all embodiments thereof) used in the method disclosed herein as described herein.

Figure 2:
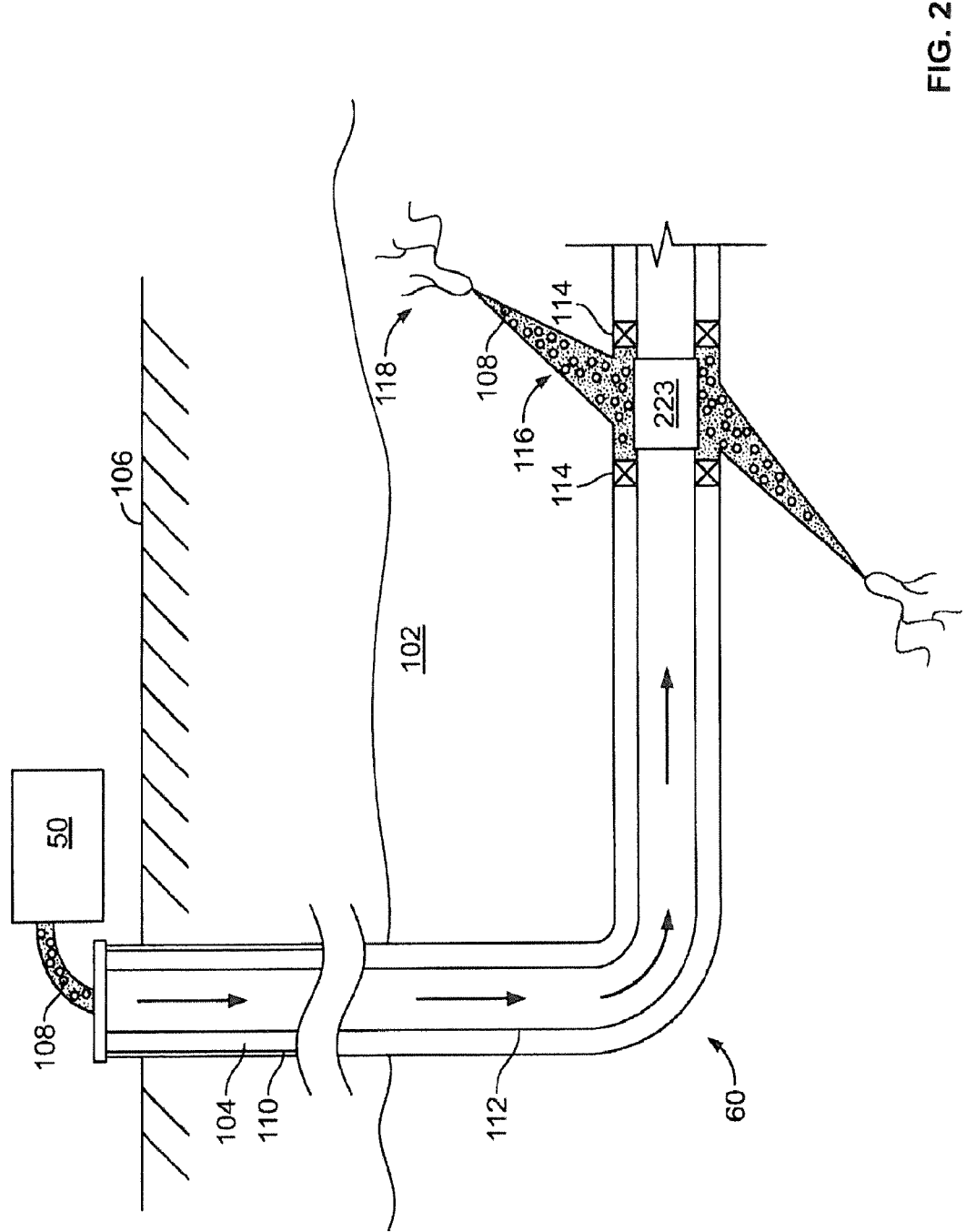
FIG. 2 is a diagram illustrating an example of a subterranean formation in which a fracturing operation can be performed in accordance with certain embodiments of the present disclosure.

The exemplary fluids, compositions and methods disclosed herein may directly or indirectly affect one or more components or pieces of equipment associated with the preparation, delivery, recapture, recycling, reuse, and/or disposal of the disclosed fluids, compositions and methods. FIGS. 1 and 2 illustrate a typical fracturing operation.

For example, and with reference to FIG. 1, the disclosed fluids, compositions and methods may directly or indirectly affect one or more components or pieces of equipment associated with an exemplary fracturing system 10, according to one or more embodiments. In certain instances, the system 10 includes a fracturing fluid producing apparatus 20 (for example, for producing a pad fracturing fluid and/or proppant slurry for use in the disclosed method), a fluid source 30, a proppant source 40, and a pump and blender system 50. The system 10 resides at the surface at a well site where a well 60 is located. For example, the fracturing fluid producing apparatus 20 can combine a gel precursor with fluid (e.g., liquid or substantially liquid) from fluid source 30, to produce a hydrated fracturing fluid (for example, the pad fluid and/or proppant slurry of the method disclosed herein) that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, as discussed above, the fracturing fluid may comprise water, a hydrocarbon fluid, a polymer gel, foam, air, wet gases and/or other fluids.

The proppant source 40 can include and provide the proppant (including the micro-proppant particulates and primary proppant particulates of the disclosed method) for combination with the fracturing fluid (for example, the pad fluid and proppant slurry) as appropriate. The system may also include an additive source 70 that can provide the degradable metal alloy milling waste particulates of the disclosed well treatment fluid and one or more additives (e.g., gelling agents, weighting agents, and/or other optional additives as discussed above) to alter the properties of the fracturing fluid (for example, the pad fluid and/or proppant slurry). For example, additives from the additive source 70 can be included to reduce pumping friction, to reduce or eliminate the fluid's reaction to the geological formation in which the well is formed, to operate as surfactants, and/or to serve other functions.

For example, the pump and blender system 50 can receive the fracturing fluid (for example, the base carrier fluid) and combine it with other components, including proppant particulates from the proppant source 40 and/or additional fluid and other additives from the additive source 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, proppant source 40 and/or additive source 70 may be equipped with one or more metering devices (not shown) to control the flow of fluids, degradable metal alloy milling waste particulates, proppant particulates, and/or other compositions to the pump and blender system 50. Such metering devices may permit the pump and blender system 50 to source from one, some or all of the different sources at a given time, and may facilitate the preparation of fracturing fluids in accordance with the present disclosure using continuous mixing or "on the fly" methods. Thus, for example, the pump and blender system 50 can provide just fracturing fluid (for example, the pad fluid) into the well at some times, just proppant slurry at some times, just proppant particulates at other times, and combinations of those components at yet other times.

FIG. 2 shows the well 60 during a fracturing operation in a portion of a subterranean formation of interest 102 (for example, a subterranean zone) surrounding a wellbore 104. For example, the formation of interest can include one or more subterranean formations or a portion of a subterranean formation.

The wellbore 104 extends from the surface 106, and the fracturing fluid 108 (for example, the pad fluid and proppant slurry) is applied to a portion of the subterranean formation 102 surrounding the horizontal portion of the wellbore. Although shown as vertical deviating to horizontal, the wellbore 104 may include horizontal, vertical, slanted, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shaped charges, a perforating gun, hydro-jetting and/or other tools.

The well is shown with a work string 112 depending from the surface 106 into the wellbore 104. The pump and blender system 50 is coupled to a work string 112 to pump the fracturing fluid 108 into the wellbore 104. The work string 112 may include coiled tubing, jointed pipe, and/or other structures that allow fluid to flow into the wellbore 104. The work string 112 can include flow control devices, bypass valves, ports, and or other tools or well devices that control a flow of fluid from the interior of the work string 112 into the subterranean zone 102. For example, the work string 112 may include ports adjacent the wellbore wall to communicate the fracturing fluid 108 directly into the subterranean formation 102, and/or the work string 112 may include ports that are spaced apart from the wellbore wall to communicate the fracturing fluid 108 into an annulus in the wellbore between the work string 112 and the wellbore wall.

The work string 112 and/or the wellbore 104 may include one or more sets of packers 114 that seal the annulus between the work string 112 and wellbore 104 to define an interval of the wellbore 104 into which the fracturing fluid 108 will be pumped. FIG. 2 shows two packers 114, one defining an uphole boundary of the interval and one defining the downhole end of the interval.

When the fracturing fluid 108 (for example, the pad fracturing fluid) is introduced into wellbore 104 (e.g., in FIG. 2, the area 223 of the wellbore 104 between packers 114) at a sufficient hydraulic pressure, one or more primary fractures 116 and microfractures 118 are created in the subterranean zone 102. As shown, the microfractures have propagated from or near the ends and edges of the primary fractures 116. The primary proppant particulates in the fracturing fluid 108 (for example, the proppant slurry) enter the fractures 116 where they may remain after the fracturing fluid flows out of the wellbore, as described above. These primary proppant particulates may "prop" fractures 116 such that fluids may flow more freely through the fractures 116. Similarly, the micro-proppant particulates in the fracturing fluid 108 (for example, the pad fluid and the proppant slurry) enter the fractures 118 where they may remain after the fracturing fluid flows out of the wellbore, as described above. The primary proppant particulates and micro-proppant particulates "prop" fractures 116 and 118, respectively, such that fluids may flow more freely through the fractures 116 and 118.

While not specifically illustrated herein, the disclosed fluids, compositions and methods may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLES

The following examples illustrate specific embodiments consistent with the present disclosure but do not limit the scope of the disclosure or the appended claims. Concentrations and percentages are by weight unless otherwise indicated.

Example 1

Examples of embodiments of the dewatering agent used in the method and well treatment fluid disclosed herein are shown by Table 1 below.

Example 2

Mix no. 6 as identified in Table 1 above was tested for its ability to break an oil and water emulsion. Mix no, 6 is an embodiment of the dewatering agent of the well treatment fluid disclosed herein and used in the method disclosed herein.

An emulsion break test was performed by first adding a 1:1 equivalent of crude oil to a vial containing Mix no. 6 (except for the polyamine polyether (PAPE)), as identified in Table 1 above. The same test was also carried out by adding a 1:1 equivalent of crude oil to a vial containing Mix no. 6 (including the polyamine polyether (PAPE)). Each vial was then agitated in order to induce emulsion formation.

Figure 3:
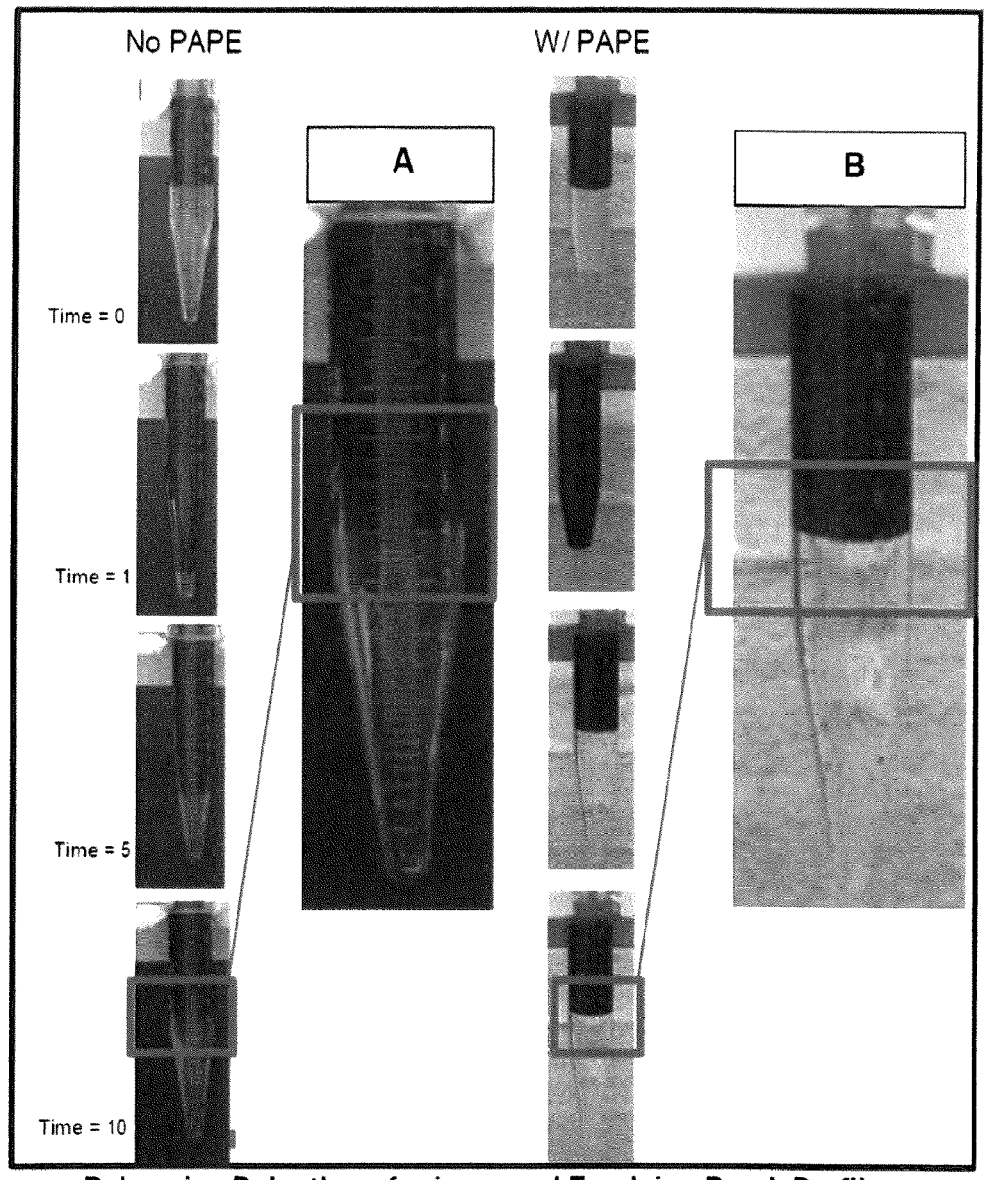
FIG. 3 illustrates the results of a standard emulsion break test carried out on an emulsion that included the dewatering agent of the well treatment fluid disclosed herein.

Photographs of each vial were captured before the vial was agitated (time=0), one minute after the vial was agitated (time=1 minute), five minutes after the vial was agitated (time=5 minutes), and 10 minutes after the vial was agitated (time=10 minutes). Copies of the photographs are shown by FIG. 3 herein. This method of testing emulsion break times is a standard operating procedure in the oil industry. The goal of the test is to identify a surfactant formulation that causes the oil and water to separate post agitation, before time=10 minutes. The ideal case would involve the biphasic oil and water profile at time=10 minutes to be equal to the biphasic oil and water profile shown at time=0, or prior to agitation. This result would imply that the surfactant formulation effectively perturbs the water/oil interface such that the emulsion bubbles can coalesce and the oil and water phases separate.

Referring now to FIG. 3, the results of the emulsion break tests are shown. As shown, the addition of the polyamine

TABLE 1

Dewatering Agent Including Polyamine Polyethers (PAPE)

| Mix | Aqueous Phase (%) | Solvent (%) | Co-Solvent (%) | Resin Alkoxylate (%) | PAPE (%) | Ethoxylated Alkanol (%) |
|---|---|---|---|---|---|---|
| 1 | Distilled Water(50) | 2-dodecyl-Pyrrolidinone[1] (5) | Isopropanol (30) | phenol formaldehyde polymer with methyloxirane[4] (5) | Polyamine polyether[8] (5) | C15 secondary alcohol, ethoxylate[7] 15 EO (5) |
| 2 | Distilled Water(50) | 2-dodecyl-Pyrrolidinone[1] (5) | Isopropanol (30) | phenol formaldehyde polymer with methyloxirane[4] (5) | Polyamine polyether[8] (5) | C12-C14 ethoxylated alcohol[8] 7EO (5) |
| 3 | Distilled Water(50) | n-octyl-pyrrolidinone(5)[2] | Isopropanol (30) | Phenol formaldehyde oxirane[5] (5) | Polyamine polyether[8] (5) | C15 secondary alcohol ethoxylate[7] 15 EO (5) |
| 4 | Distilled Water(50) | n-octyl-pyrrolidinone[2] (5) | Isopropanol (30) | Phenol formaldehyde oxirane[5] (5) | Polyamine polyether[8] (5) | C12-C14 elhoxylated alcohol[8] 7EO (5) |
| 5 | Distilled Water(50) | Dimethyl 2-Methyglutarate[3] (5) | Isopropanol (30) | Phenol formaldehyde oxirane[5] (5) | Polyamine polyether[8] (5) | C15 secondary alcohol ethoxylate[7] (5) |
| 6 | Distilled Water(50) | Dimethyl 2-Methylglutarate[3] (5) | Isopropanol (30) | Phenol formaldehyde oxirane[5] (5) | Polyamine polyether[8] (5) | C12-C14 ethoxylated alcohol[8] 7EO (5) |

[1] sold by Ashland™ in association with the trademark Surfadone™ LP300
[2] sold by Ashland™ in association with the trademark Surfadone™ LP100
[3] sold by Solvay in association with the trademark Rhodiasolv® IRIS
[4] sold by BASF in association with the trademark Basorol® 9429
[5] sold by BASF in association with the trademark Basorol® 9954
[6] sold by KMCO, LLC in association with the trademark KB 1410
[7] sold by Dow Chemical in association with the trademark Tergitol 15-s-15
[8] sold by Huntsman in association with the trademark Surfonic® L24-7 polyether (PAPE) material to the formulation allows for comprehensive phase separation of the water and crude (FIG. 3B). This is shown by the fact that when the polyamine polyether (PAPE) was not added, the volume of the aqueous phase is only 4 mL (FIG. 3A), suggesting that 1 mL of water remains in the oil-phase. Upon addition of the polyamine polyether (PAPE) material, the volume of the aqueous phase is now 5 mL (FIG. 3B), which suggests that the polyamine polyether (PAPE) indeed improves the "dewatering" or separation of the oil/water phases.

Thus, the tests showed that the polyamine polyether of the dewatering agent of the well treatment fluid enhances the demulsifying power of the demulsifying surfactant and results in a more rapid, comprehensive separation of water and oil emulsions.

Example 3

Next, Mix no. 6 as identified in Table 1 above was again tested for its ability to break an oil and water emulsion. Mix no. 6 is an embodiment of the dewatering agent of the well treatment fluid disclosed herein and used in the method disclosed herein.

An emulsion break test (EBT) was performed by first adding a 1:1 equivalent of crude oil to a vial containing Mix no. 6 (except for the polyamine polyether (PAPE)), as identified in Table 1 above. The same test was also carried out by adding a 1:1 equivalent of crude oil to a vial containing Mix no. 6 (including the polyamine polyether (PAPE)). Each vial was then agitated in order to induce emulsion formation.

Figure 4:
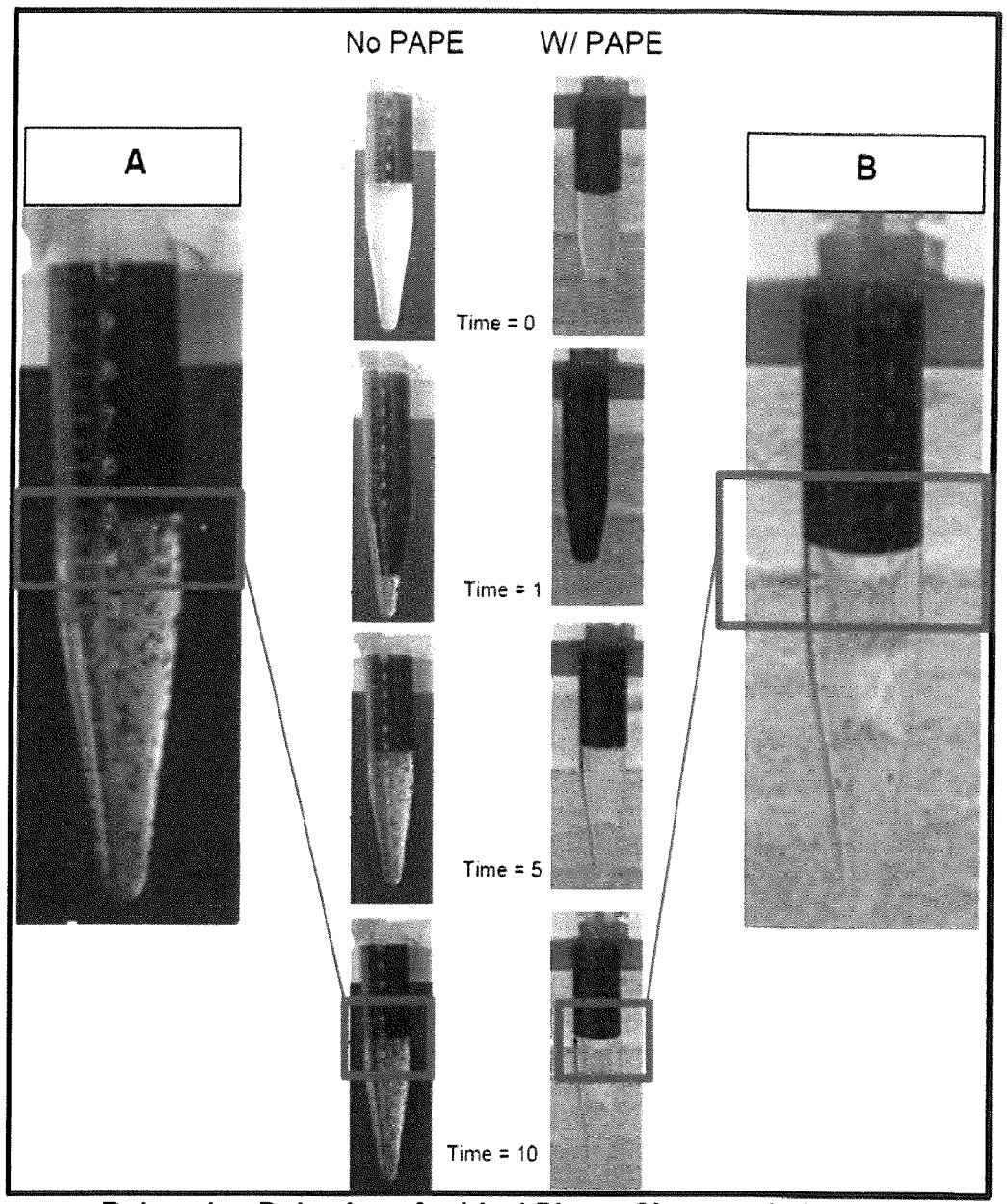
FIG. 4 also illustrates the results of a standard emulsion break test carried out on an emulsion that included the dewatering agent of the well treatment fluid disclosed herein.

Photographs of each vial were captured before the vial was agitated (time=0), one minute after the vial was agitated (time=1 minute), five minutes after the vial was agitated (time=5 minutes), and 10 minutes after the vial was agitated (time=10 minutes). Copies of the photographs are shown by FIG. 4 herein. This method of testing emulsion break times is a standard operating procedure in the oil industry. The goal of the test is to identify a surfactant formulation that causes the oil and water to separate post agitation, before time=10 minutes. The ideal case would involve the biphasic oil and water profile at time=10 minutes to be equal to the biphasic oil and water profile shown at time=0, or prior to agitation. This result would imply that the surfactant formulation effectively perturbs the water/oil interface such that the emulsion bubbles can coalesce and the oil and water phases separate.

Referring now to FIG. 4, the results of the emulsion break tests are shown. FIG. 4 illustrates the significance of the addition of the polyamine polyether (PAPE) to the demulsifying surfactant of the dewatering agent. As shown by the vial containing all of the components of Mix no. 6, except for the polyamine polyether (PAPE), the oil and water emulsion was separated into an oil and water phase, with the water phase being approximately five mL after 10 minutes following agitation. As shown by the vial containing all of the components of Mix no. 6, including the polyamine polyether (PAPE), the oil and water emulsion was separated into an oil and water phase, with the water phase also being approximately 5 ml after 10 minutes following agitation.

However, the photographs of the vial that contained the polyamine polyether (PAPE) show that a more comprehensive phase separation occurred when the polyamine polyether (PAPE) was present. Despite the comprehensive separation of the oil and water phases (aqueous phase volume of 5 mL), the small oil droplets in FIG. 4A suggest inadequate separation of oil and water. As shown, there were far fewer oil droplets in the aqueous phase (lower clear phase) shown by FIG. 4B.

Thus, the dewatering agent of the well treatment fluid disclosed herein provided an aqueous phase devoid of any oil drops or filmy residue. Although not intending to be bound by any particular theory of operation, one explanation for this result may be the slightly more lipophilic polyamine polyether assisting with transporting the surfactant to the oil/water interface, which reduced the interfacial tension and resulted in coalescence of the oil droplets which, in turn, resulted in a more comprehensive phase separation.

Example 4

The ability of the dewatering agent of the well treatment fluid disclosed herein to maximize water recovery and hydrocarbon production from fracture stimulated shale reservoirs was tested in the laboratory using the RockPerm® service provided by Halliburton. The RockPerm® service is a laboratory testing process performed by specially trained technicians in local area labs. The tests involved saturating a 100 mesh sand pack with Mix no. 6 as identified in Table 1 above, and then using crude oil to displace the brine from the sand pack. The tests were largely an evaluation of the interfacial tension between the crude oil and surfactant brine.

A first test was carried out using all of the components of Mix no. 6, except for the polyamine polyether (PAPE). The same test was also carried out using all of the components of Mix no. 6, including the polyamine polyether (PAPE). The tests were also carried out on another, more costly demulsifying surfactant (based on current pricing). All the tests were run using three different crude oils. Field cuttings were used in the tests, and therefor wettability and surfactant adsorption parameters were measured as well, however these effects are not as significant as the interfacial tension.

Figure 5:
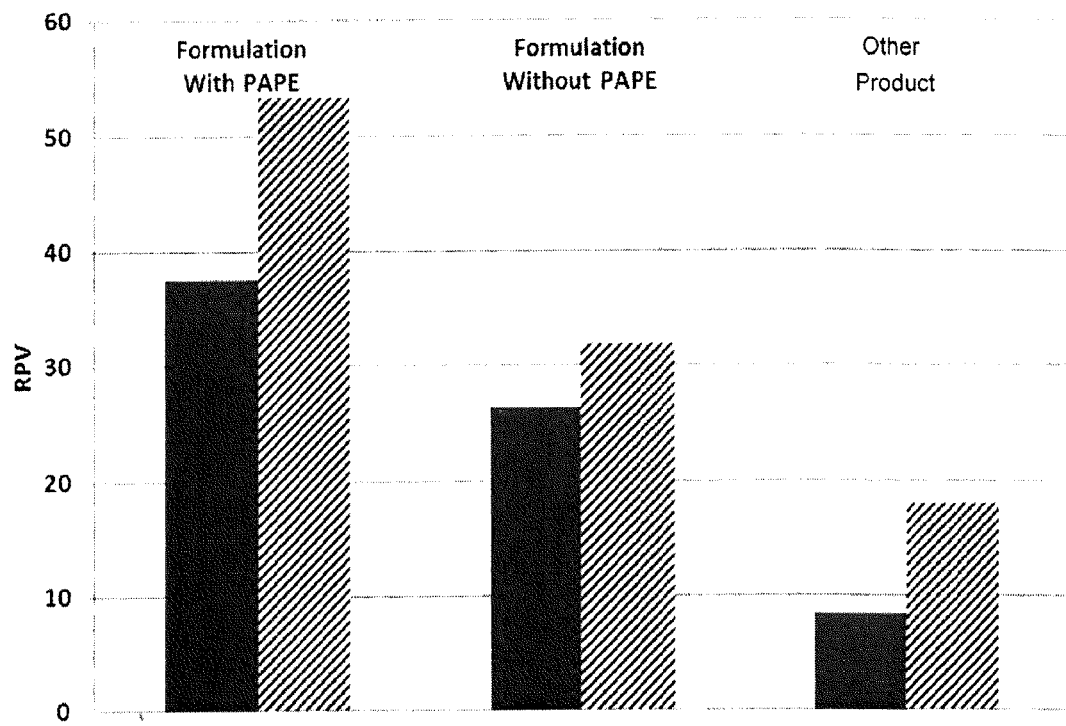
FIG. 5 is a chart illustrating the results of the laboratory tests carried out to test the interfacial tension and flow performance of the dewatering agent of the well treatment fluid disclosed herein.

Referring now to FIG. 5, the results of the tests are illustrated by a chart showing the flow performance of Mix no. 6, both with and without the polyamine polyether (PAPE) for three different crude oils. The flow performance of the mixtures is represented by the RockPerm® value (the "RPV") on the Y-axis of the chart. The tests took into account the time it takes for the displacement of oil from the sand pack. This time is representative of the time it takes for the surfactant to migrate to the oil/water interface from the bulk aqueous phase.

As shown by FIG. 5, the inclusion of the polyamine polyether in Mix no. 6 improved the RPV value (FIG. 5, W/PAPE) on multiple crude oils (FIG. 5, dark grey, light grey, red columns as compared to the same surfactant formulation without the polyamine polyether (FIG. 5, No PAPE)) and the other demulsifying agent.

Therefore, the present treatment additives and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of treating a well, comprising:
introducing a well treatment fluid into the well, said well treatment fluid including an aqueous base fluid and a dewatering agent, said dewatering agent including:
water;
a demulsifying surfactant, wherein said demulsifying surfactant includes:
a solvent selected from the group consisting of methyl 9-decenoate, methyl 9-dodecenoate, N, N-dimethyl 9-decenamide, diethyl carbonate, triethyl citrate, dodecyl acetate, dimethyl 2-methylglutarate, 1-dodecyl-2-pyrrolidinone, 2-dodecyl-pyrrolidinone, N—$(C_2H_4)_n$CH$_3$-pyrrolidinone (wherein n is 1 to 22), n-octyl-pyrrolidinone, dibutyl ether, isoamyl ether, di-n-amyl ether, dihexyl ether, heptyl ether, dioctyl ether, dodecyl ether, benzyl hexyl ether, di-n-alkyl-ethers having the formula O[$(CH_2)_xCH_3$]$_2$ (wherein x is 3 to 35), and combinations thereof;
a co-solvent;
an ethoxylated alcohol; and
a resin alkoxylated oligomer; and
a polyamine polyether.

2. The method of claim 1, wherein said dewatering agent is present in said treatment fluid in an amount in the range of from about 0.001 percent by volume to about 80.0 percent by volume based on the total volume of said treatment fluid.

3. The method of claim 1, wherein said dewatering agent is water external emulsion.

4. The method of claim 1, wherein said demulsifying surfactant is present in said dewatering agent in an amount in the range of from about 0.001 percent by volume to about 80.0 percent by volume based on the total volume of said dewatering agent.

5. The method of claim 1, wherein said polyamine polyether is an alkoxylated polyamine.

6. The method of claim 1, wherein said polyamine polyether is present in said dewatering agent in an amount in the range of from about 0.5 percent by volume to about 80.0 percent by volume based on the total volume of said dewatering agent.

7. A method of fracturing a subterranean formation, comprising:
pumping a fracturing fluid into the formation at a pressure above the fracture gradient of the formation to form a fracture in the formation, said fracturing fluid including an aqueous base fluid, a plurality of proppant particulates, and a dewatering agent, said dewatering agent including:
water;
a demulsifying surfactant which includes a solvent selected from the group consisting of methyl 9-decenoate, methyl 9-dodecenoate, N, N-dimethyl 9-decenamide, diethyl carbonate, triethyl citrate, dodecyl acetate, dimethyl 2-methylglutarate, 1-dodecyl-2-pyrrolidinone, 2-dodecyl-pyrrolidinone, N—$(C_2H_4)_n$CH$_3$-pyrrolidinone (wherein n is 1 to 22), n-octyl-pyrrolidinone, dibutyl ether, isoamyl ether, di-n-amyl ether, dihexyl ether, heptyl ether, dioctyl ether, dodecyl ether, benzyl hexyl ether, di-n-alkyl-ethers having the formula O[$(CH_2)_xCH_3$]$_2$ (wherein x is 3 to 35), and combinations thereof; and
a polyamine polyether;
placing proppant particulates in said fracture; and
ceasing pumping of said fracturing fluid into the formation.

8. The method of claim 7, wherein said dewatering agent is present in said treatment fluid in an amount in the range of from about 0.001 percent by volume to about 80.0 percent by volume based on the total volume of said treatment fluid.

9. The method of claim 7, wherein said demulsifying surfactant further includes:
a co-solvent;
an ethoxylated alcohol; and
a resin alkoxylated oligomer.

10. The method of claim 7, wherein said demulsifying surfactant is present in said dewatering agent in an amount in the range of from about 0.001 percent by volume to about 80.0 percent by volume based on the total volume of said dewatering agent.

11. The method of claim 7, wherein said polyamine polyether is an alkoxylated polyamine.

12. The method of claim 7, wherein said polyamine polyether is present in said dewatering agent in an amount in the range of from about 0.5 percent by volume to about 80.0 percent by volume based on the total volume of said dewatering agent.

13. The method of claim 7, wherein said fracturing fluid is introduced into the well using pumping equipment.

14. A fracturing fluid comprising a dewatering agent, said dewatering agent including:
water;
a demulsifying surfactant which includes a solvent selected from the group consisting of methyl 9-decenoate, methyl 9-dodecenoate, N, N-dimethyl 9-decenamide, diethyl carbonate, triethyl citrate, dodecyl acetate, dimethyl 2-methylglutarate, 1-dodecyl-2-pyrrolidinone, 2-dodecyl-pyrrolidinone, N—$(C_2H_4)_n$CH$_3$-pyrrolidinone (wherein n is 1 to 22), n-octyl-pyrrolidinone, dibutyl ether, isoamyl ether, di-n-amyl ether, dihexyl ether, heptyl ether, dioctyl ether, dodecyl ether, benzyl hexyl ether, di-n-alkyl-ethers having the formula O[$(CH_2)_xCH_3$]$_2$ (wherein x is 3 to 35), and combinations thereof; and
a polyamine polyether.

15. The fracturing fluid of claim 14, wherein said demulsifying surfactant further includes:
a co-solvent;
an ethoxylated alcohol; and
a resin alkoxylated oligomer.

16. The fracturing fluid of claim 14, wherein said demulsifying surfactant is present in said dewatering agent in an amount in the range of from about 0.001 percent by volume to about 80.0 percent by volume based on the total volume of said dewatering agent.

17. The fracturing fluid of claim 14, wherein said polyamine polyether is an alkoxylated polyamine.

18. The fracturing fluid of claim 14, wherein said polyamine polyether is present in said dewatering agent in an amount in the range of from about 0.5 percent by volume to about 80.0 percent by volume based on the total volume of said dewatering agent.

19. A method of treating a well, comprising introducing a well treatment fluid into the well, said well treatment fluid including an aqueous base fluid and a dewatering agent, said dewatering agent including:

water;

a demulsifying surfactant which includes a solvent selected from the group consisting of methyl 9-decenoate, methyl 9-dodecenoate, N, N-dimethyl 9-decenamide, diethyl carbonate, triethyl citrate, dodecyl acetate, dimethyl 2-methylglutarate, 1-dodecyl-2-pyrrolidinone, 2-dodecyl-pyrrolidinone, $N-(C_2H_4)_n CH_3$-pyrrolidinone (wherein n is 1 to 22), n-octyl-pyrrolidinone, dibutyl ether, isoamyl ether, di-n-amyl ether, dihexyl ether, heptyl ether, dioctyl ether, dodecyl ether, benzyl hexyl ether, di-n-alkyl-ethers having the formula $O[(CH_2)_x CH_3]_2$ (wherein x is 3 to 35), and combinations thereof; and a polyamine polyether which is an alkoxylated polyamine.

20. The method of claim 19, wherein said dewatering agent is present in said treatment fluid in an amount in the range of from about 0.001 percent by volume to about 80.0 percent by volume based on the total volume of said treatment fluid.

21. The method of claim 19, wherein said demulsifying surfactant is present in said dewatering agent in an amount in the range of from about 0.001 percent by volume to about 80.0 percent by volume based on the total volume of said dewatering agent.

22. The method of claim 19, wherein said polyamine polyether is present in said dewatering agent in an amount in the range of from about 0.5 percent by volume to about 80.0 percent by volume based on the total volume of said dewatering agent.

23. A well treatment fluid comprising a dewatering agent, said dewatering agent including:

water;

a demulsifying surfactant which includes a solvent selected from the group consisting of methyl 9-decenoate, methyl 9-dodecenoate, N, N-dimethyl 9-decenamide, diethyl carbonate, triethyl citrate, dodecyl acetate, dimethyl 2-methylglutarate, 1-dodecyl-2-pyrrolidinone, 2-dodecyl-pyrrolidinone, $N-(C_2H_4)_n CH_3$-pyrrolidinone (wherein n is 1 to 22), n-octyl-pyrrolidinone, dibutyl ether, isoamyl ether, di-n-amyl ether, dihexyl ether, heptyl ether, dioctyl ether, dodecyl ether, benzyl hexyl ether, di-n-alkyl-ethers having the formula $O[(CH_2)_x CH_3]_2$ (wherein x is 3 to 35), and combinations thereof; and a polyamine which is an alkoxylated polyamine.

24. The well treatment fluid of claim 23, wherein said demulsifying surfactant further includes:

a co-solvent;

an ethoxylated alcohol; and a resin alkoxylated oligomer.

25. The well treatment fluid of claim 23, wherein said demulsifying surfactant is present in said dewatering agent in an amount in the range of from about 0.001 percent by volume to about 80.0 percent by volume based on the total volume of said dewatering agent.

26. The well treatment fluid of claim 23, wherein said polyamine polyether is present in said dewatering agent in an amount in the range of from about 0.5 percent by volume to about 80.0 percent by volume based on the total volume of said dewatering agent.

* * * * *